United States Patent
Mott

(10) Patent No.: US 6,269,943 B1
(45) Date of Patent: Aug. 7, 2001

(54) CONVEYOR ASSEMBLY

(75) Inventor: George T. Mott, Alburtis, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 09/364,421

(22) Filed: Jul. 30, 1999

(51) Int. Cl.[7] ............................................. B65G 15/08
(52) U.S. Cl. ................................................... 198/823
(58) Field of Search ................................. 198/832, 825, 198/818, 821, 836.1

(56) References Cited

U.S. PATENT DOCUMENTS

| | | |
|---|---|---|
| 3,300,023 * | 1/1967 | Lseutzmann et al. ........... 198/825 X |
| 4,359,156 | 11/1982 | Austin . |
| 4,789,056 | 12/1988 | Bourbeau . |
| 4,793,470 | 12/1988 | Anderson . |
| 4,848,540 | 7/1989 | Gray . |
| 4,917,232 | 4/1990 | Densmore . |
| 4,927,007 | 5/1990 | Krameer . |
| 4,932,516 | 6/1990 | Andersson . |
| 4,989,727 | 2/1991 | Gordon . |
| 5,007,528 | 4/1991 | Hideharu . |
| 5,038,924 | 8/1991 | Stoll . |
| 5,044,490 | 9/1991 | East . |
| 5,131,530 | 7/1992 | Rappen . |
| 5,197,592 | 3/1993 | East . |
| 5,267,642 | 12/1993 | Gharpurey et al. . |
| 5,350,053 | 9/1994 | Archer . |
| 5,351,810 | 10/1994 | Tingskog . |
| 5,353,920 | 10/1994 | Szalankiewicz et al. . |
| 5,368,154 | 11/1994 | Campbell . |
| 5,467,866 | 11/1995 | Swinderman . |
| 5,564,557 | 10/1996 | Morita . |
| 5,590,757 | 1/1997 | Walter . |
| 5,927,478 | 7/1999 | Archer . |

FOREIGN PATENT DOCUMENTS

| | | | | |
|---|---|---|---|---|
| 1088779 | * | 3/1955 | (FR) ...................................... | 198/823 |
| 63-247207 | * | 10/1988 | (JP) ...................................... | 198/823 |
| 4-112113 | * | 4/1992 | (JP) ...................................... | 198/823 |

* cited by examiner

Primary Examiner—James R. Bidwell
(74) Attorney, Agent, or Firm—Dann, Dorfman, Herrell and Skillman; Stephen H. Eland

(57) ABSTRACT

A conveyor assembly which includes a continuous belt for carrying bulk material such as stone, ore, grain etc. is provided. The conveyor transports the material to a discharge point where the material is discharged from the belt as the belt wraps around a head pulley. The belt is troughed between the area that the material is loaded onto the belt and the head pulley. A plurality of belt supports support the belt between the area where the material is loaded onto the belt and the head pulley. Each belt support includes a central roller for providing generally frictionless rolling support for the central portion of the belt. Each belt support further includes a pair of wing supports for supporting the troughing side of the belt. Each wing support includes a roller adjacent the central roller and a pair of slider bars supporting the marginal edges of the belt. The slider bars support the marginal edges of the belt between successive belt supports to retain the belt in engagement with a skirt to prevent spillage of material.

4 Claims, 3 Drawing Sheets

CONVEYOR ASSEMBLY

FIELD OF THE INVENTION

The present invention relates to conveyor systems, and more particularly to conveyor systems using a flat conveyor belt which has its marginal side portions is deflected upwardly to form a troughed configuration in the load zone of the system.

BACKGROUND OF THE INVENTION

Typically, a conveyor belt is supported by rollers or a slider bed. The sides of the belt are normally angled upwardly to form a trough in the belt. Usually the trough is either 20, 35, or 45 degrees.

In a slider bed the belt slides on steel or some type of low friction plastic. As the width, load and speed of the belt increases the friction increases to a point that the heat build-up between the belt and the slider bed causes destruction of both the belt and the slider bed.

In high impact loading situations, the conveyor belt may be damaged when a slider bed is used. When sharp material falls on the belt supported by the slider bed, the slider bed does not absorb or dissipate the energy sufficiently, so the conveyor belt may be cut or gouged. In certain situations, a cushioning layer is disposed beneath the slider bars to dissipate the impact forces. However, the cushioning layer may not sufficiently dissipate the impact energy for large sharp materials, leading to belt damage.

In a belt supported by rollers the friction is substantially eliminated. However, the belt tends to sag between successive rollers due to the weight of the material and the belt. This sagging causes several problems. For instance, the metal skirt in the area where material is loaded onto the belt tends to become scalloped causing converging pinch points to develop between the belt and the bottom edge of the skirtboard. These pinch points cause material entrapment and resultant damage to the belt.

Further, a resilient seal is typically provided on the outside of the skirtboard. The seal is adjusted to operate in contact with the surface of the belt to seal the fine particles of material and dust from spilling. The sagging of the belt and material between the rollers causes loss of contact between the seal and the belt thus allowing spillage of material from the belt.

SUMMARY OF THE INVENTION

In light of the foregoing, the present invention provides an improved conveyor assembly for limiting or preventing spillage of material as the material is conveyed. In addition, the conveyor assembly reduces or eliminates heat build-up between the load bearing portions of the belt and the belt supports that support the belt, thereby reducing wear on the belt and the supports. The present invention also provides increased dissipation of impact forces in the loading zone of the belt to reduce or eliminate damage to the belt.

More specifically, the present invention provides a conveyor assembly comprising a continuous troughing belt trained about a head pulley and a tail pulley. The assembly has a loading zone onto which bulk material is deposited, and a transport zone between the loading zone and the head pulley. A pair of skirts extend longitudinally along the marginal edges of the conveyor belt in operative engagement with the outer surface of the belt prevent material from spilling from the belt.

A plurality of belt supports are longitudinally aligned along the length of the belt for supporting the belt. Each belt support comprises a base extending across the width of the belt. A central roller connected to the base intermediate the edges of the belt supports an intermediate portion of the belt. A pair of wing supports connected to the base straddle the central roller to support the troughing sides of the belt.

Each wing support includes an elongated slider bar extending along one of the marginal edges of the belt, engaging the inner surface of the belt. The slider bar supports the marginal edge to maintain the marginal edge in operative engagement with one of the skirts.

Each wing support also includes a wing roller disposed intermediate the slider bar and the central roller. The wing roller is in operative engagement with the inner surface of the belt to support a troughing side of the belt adjacent the intermediate portion of the belt. The wing roller has an axis of rotation that is transverse the axis of rotation of the central roller.

In addition, preferably, the belt supports are arranged so that the pitch between the belts supports varies between the load zone and the head pulley. Specifically, preferably the distance between adjacent belt supports in the transport zone is greater than the distance between adjacent belt supports in the loading zone.

DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF THE PREFERRED EMBODIMENT

Figure 1:
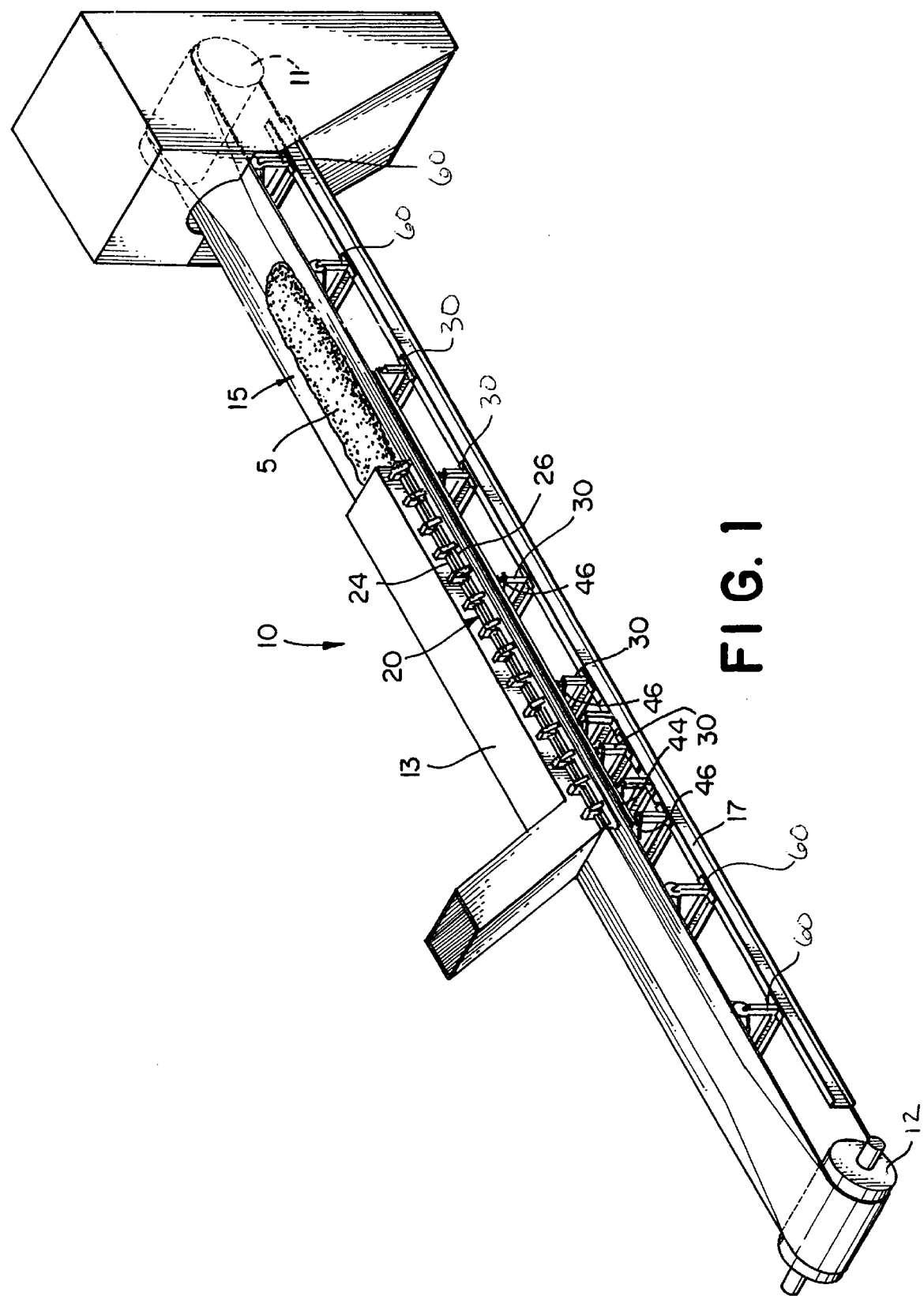
FIG. 1 is a perspective view of a conveyor assembly embodying aspects of the present invention.

Referring now to the drawings in general and to FIG. 1 in particular, a conveyor assembly is designated generally 10. The conveyor assembly includes an endless troughing conveyor belt 15 entrained about a head pulley 11 and a tail pulley 12. A plurality of first belt supports 30 and second belt supports 60 support the conveyor belt 15 between the head pulley 11 and the tail pulley 12. The conveyor 10 transports material 5 that is loaded onto the conveyor through a chute 13. The conveyor 10 then conveys the material away from the chute and discharges the material at the head pulley 11. Preferably, a pair of sidewalls or skirts 20 extend along the marginal edges of the upper run of the conveyor 10 to prevent material from spilling over the edges of the conveyor belt 15 as the material is conveyed.

The conveyor belt 15 is an flat endless belt formed of a heavy duty material such as a fabric carcass such as nylon, polyester, kevlar, fiberglass, steel or monofilament covered with a rubber compound to form a belt from $\frac{1}{16}$" to over 1" thick. The marginal side portions of the belt are deflected upwardly to form a troughed configuration. The belt is generally at least 36 inches wide, and the present assembly is particularly suited to operate with a conveyor belt 48 inches or wider.

The conveyor assembly includes a loading zone, a settling zone and a transport zone. In the loading zone, material is loaded onto the belt from the chute 13. After the material is loaded onto the belt, the material tends to settle as it is conveyed by the belt. From the loading zone, the material is conveyed along the settling zone wherein the material becomes substantially settled. From the settling zone, the material is conveyed along the transport zone to a discharge chute.

A pair of skirts 20 disposed along the sides of the belt 15 prevent material from spilling off the belt. After the material has settled the skirts 20 may not be necessary to retain the material on the belt. Accordingly, preferably the skirts terminate adjacent the end of the settling zone.

Figure 3:
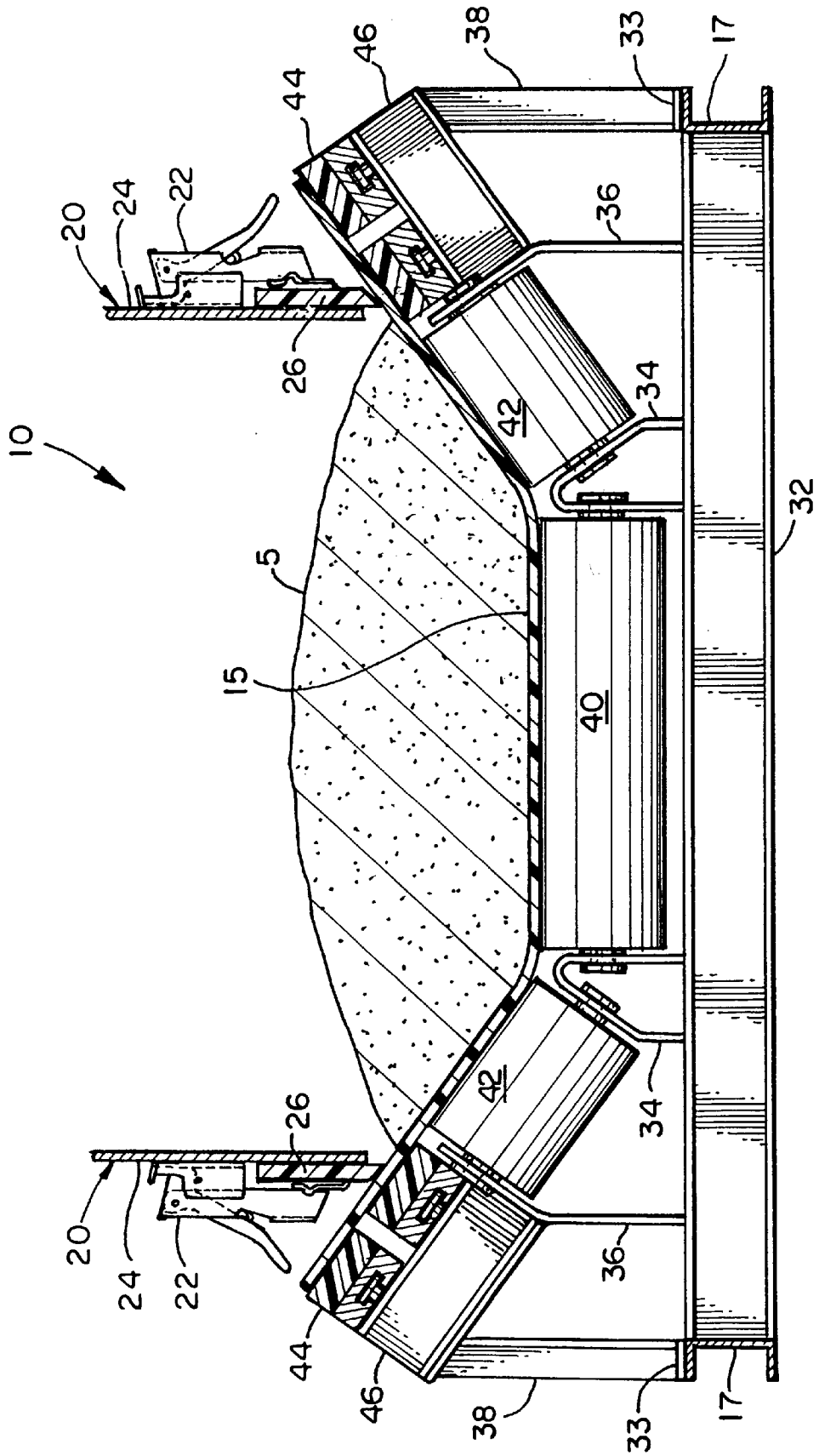
FIG. 3 is an enlarged end view of a belt support for the conveyor assembly illustrated in FIG. 1.

Referring to FIGS. 1 and 3, each skirt 20 preferably includes a mount for attaching the skirt to the conveyor frame. In addition, each skirt preferably includes a vertical skirtboard 24 and a resilient skirt seal 26.

The skirt board 24 is a generally planar longitudinally elongated member that forms a vertical wall along a marginal edge of the belt, thereby forming a sidewall of the troughing belt. Preferably, the skirtboard is formed of a rigid durable material such as steel. Therefore, it is desirable to maintain a gap between the lower edge of the skirtboard 24 and the surface of the conveyor belt to prevent the skirtboard from damaging the belt and to prevent the conveyor belt from wearing away the skirtboard. Accordingly, as shown in FIG. 3, the skirtboard 24 is vertically separated from the belt so there is a gap between the lower edge of the skirtboard and the outer surface of the conveyor belt.

The skirt seal 26 seals the gap between the lower edge of the skirtboard 24 and the surface of the conveyor belt. The skirt seal is formed of a durable resilient elastomeric material. The lower edge of the seal contacts the surface of the belt, and the upper edge of the seal is attached to the outer side of the skirtboard 24. In this way, the skirt seal 26 seals the gap between the belt and the skirtboard to prevent material from spilling off the belt through the gap, Since the seal is in direct contact with the belt, the seal will tend to wear during use. Accordingly, preferably, the seal is removably attached to the skirtboard so that the skirt seal can be replaced. An exemplary skirt with a removable seal is the Clamp-Mount skirt board and Dura-Seal manufactured by ASGCO Manufacturing, Inc.

Referring again to FIG. 1, the conveyor belt is trained about the head pulley 11, which drives the belt, and the tail pulley 12. Between the head pulley and the tail pulley, the upper run of the belt is supported by a plurality of first belt supports 30 and second belt supports 60. The belt supports 30, 60 engage the inner surface of the belt and are configured to support the belt in a troughing configuration. The first belt supports 30 support the belt along the loading zone and the settling zone. The second belt supports 60 support the belt along the remaining portion of the upper run of the belt.

Referring to FIG. 3, the details of one of the first belt supports is shown most clearly. The first belt support 30 includes a central roller 40 and a pair of wing supports, each comprising a wing roller 42 and one or more slider bars 44. The central roller supports the middle portion of the conveyor belt that carries a significant portion of the weight of the material 5.

The central roller 40 has an axis of rotation that is substantially horizontal to provide support for the middle portion of the conveyor belt. The central roller 40 may be formed of steel. Alternatively, the central roller may be formed of an impact absorbing material such as rubber, plastic, urethane or a combination of steel and one or more of such energy absorbing materials. For example, in high impact loading applications the central roller may be formed of 25–50 durometer rubber rollers to absorb energy and reduce or eliminate damage to the belt from the impact. Alternatively, in low impact loading applications, the central roller may be formed of steel. In this way, the central roller rotatably engages the inner surface of the conveyor belt to provide substantially frictionless support of the central portion of the belt. In addition, Since the central roller of adjacent belt supports 30 are spaced apart from one another, the central portion of the belt can deflect to absorb impact forces, thereby reducing damage to the belt.

The wing supports straddle the central roller, and provide support for the troughing sides of the conveyor belt. The wing supports can each include one or more wing rollers 42. Similar to the central rollers 40, the wing rollers 42 may be formed of steel and/or an impact absorbing material to dissipate impact forces. Each wing roller 42 is adjacent the central roller 40 and preferably is less than half the length of the central roller. The axis of rotation of the wing roller 42 is transverse the axis of rotation of the central roller. Accordingly, the end of the wing roller remote from the central roller is higher than the central roller. In this way, the wing roller provides a rolling surface that is transverse the central roller to provide substantially frictionless support for the lower portion of one of the troughing sides of the belt, adjacent the middle portion of the belt. In addition, the lower portion of the troughing sides carry the majority of material weight supported by the troughing sides. Therefore, the wing roller 42 provides substantially frictionless support for the portion of the troughing side carrying most of the material load on the troughing side.

The slider bars 44 support the upper portion of the troughing sides of the conveyor belt. The slider bars 44 extend along the marginal edges of the conveyor belt, and are supported by a plurality of the first belt supports 30 along the length of the belt. The slider bars 44 are elongated bars having a generally rectangular cross-section, so that the upper surface of the slider bars provide a sliding surface for supporting the upper portion of the troughing sides. The slider bars may be formed of a homogeneous material such as an elastomer or metal. However, in the present instance, the slider bars have two portions, an elastomeric wear portion and a metal support channel. The wear portion engages the inner surface of the belt, and is preferably formed of a low friction wear-resistant material such as UHMW polyethylene or polyurethane. The metal support channel is fixed to and coextensive with the elastomeric wear portion. The metal channel is sufficiently rigid to prevent the slider bar from significantly deforming downwardly under the load of the belt 15 and material 5. The metal channel includes a t-slot for receiving a bolt to removably attach the slider bars to a vertical support beam 46. In this way, the slider bars provide a generally planar sliding surface to support the marginal edges of the belt.

The conveyor belt lays on the slider bars, so that the slider bars provide continuous and uninterrupted support for the marginal edges of the conveyor belt along the length of the conveyor belt in the loading zone and the settling zone. In this way, the slider bars prevent the marginal edges of the conveyor belt from sagging between adjacent belt supports 30. Therefore, the slider bars retain the skirt seal in operative engagement with the belt between belt supports to prevent gaps from forming between the skirt seal 26 and the belt at a point intermediate adjacent belt supports.

Each of the first belt supports 30 includes an elongated base 32 that preferably extends across the width of the belt. The base 32 is a rigid member, and in the present instance is a steel I-beam. A foot 33 is attached to each end of the base 32 for rigidly attaching the belt support to the conveyor frame.

The rollers and slider bars are attached to the base 32 by a plurality of stanchions. The central roller 40 is rotatably supported by a pair of inner stanchions 34 that straddle the central roller. Each wing roller 42 is supported on one end by one of inner stanchions 34 and on the opposite end by a central stanchion 36. The slider bars 44 are supported between one of the central stanchions and an outer stanchion 38. The stanchions 34, 36, 38 are rigidly connected to the base 32 and project upwardly from the base. Preferably, the stanchions are laterally aligned along the width of the base 32.

Figure 2:
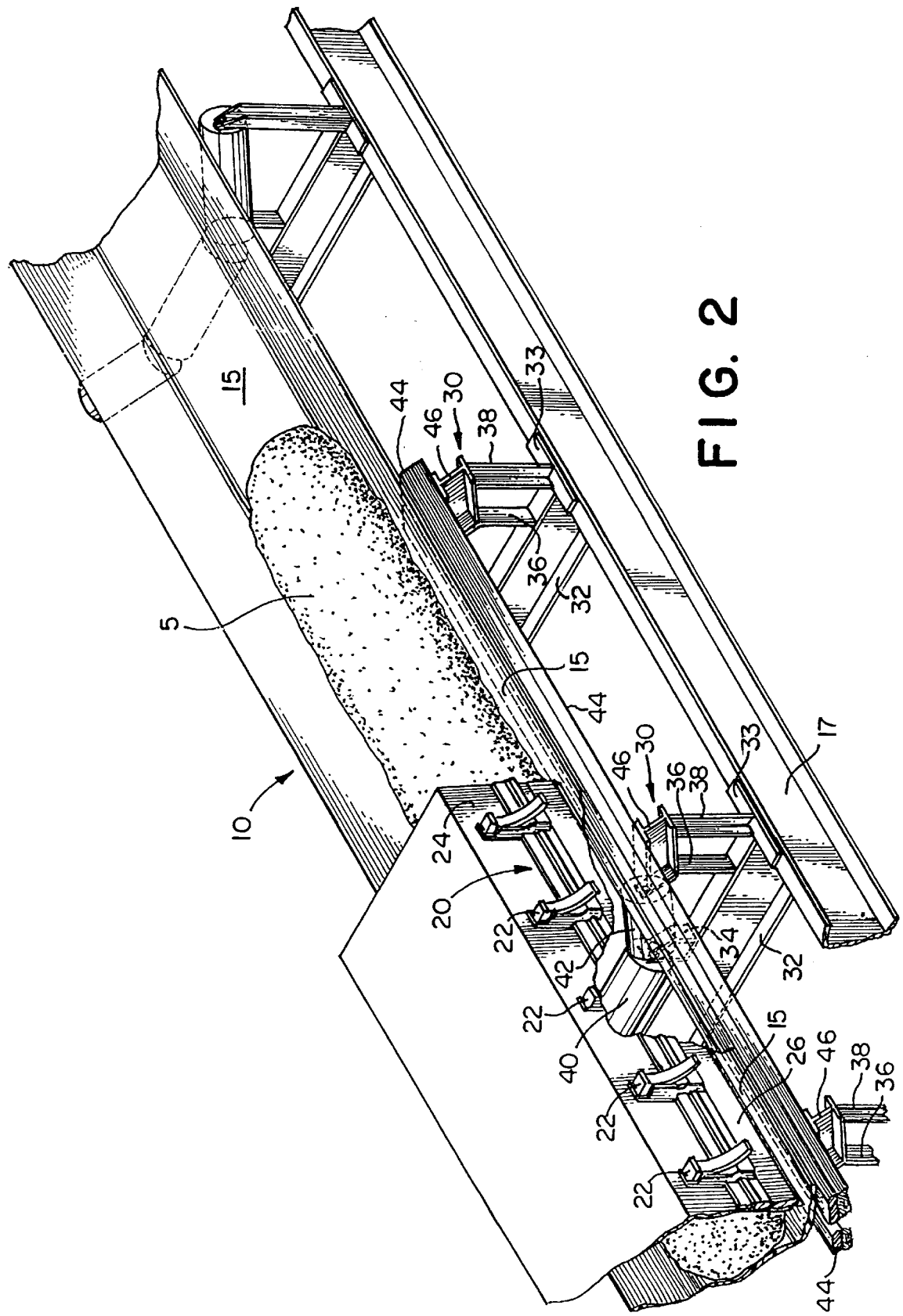
FIG. 2 is an enlarged fragmentary view of the conveyor assembly illustrated in FIG. 1.

Referring to FIG. 2, the second belt supports 60 support the belt outside of the loading and settling zones. The second belt supports 60 include a central roller 62 and a pair of wing rollers 64 for supporting the troughing sides of the belt. Each wing roller 64 extends across substantially the entire width of one of the troughing sides.

Referring to FIG. 1, the first and second belt supports 30, 60 are longitudinally aligned along the length of the belt between the loading zone and the head pulley 11. The spacing between adjacent belt supports may be uniform in certain applications. However, preferably the spacing between the first belt supports 30 in the loading zone is less than the spacing between the second belt supports 60 in the transport zone. In the present instance, the belt 15 is approximately 60 inches wide and the second belt supports 60 are spaced apart approximately 4 feet in the transport zone. In contrast, preferably, the first belt supports 30 are closer together in the loading zone to support the belt against the impact forces from the material 5 being loaded onto the conveyor belt. More specifically, in the present instance, the spacing between adjacent first belt supports 30 in the loading zone is 1½ feet in the loading zone. In a high impact loading application, the first belt supports 30 may be spaced closer together, being spaced several inches apart.

It will be recognized by those skilled in the art that changes or modifications can be made to the above-described embodiments without department from the broad inventive concept of the invention. It should therefore be understood that this invention is not limited to the particular embodiments described herein but is intended to include all changes and modifications that are within the scope and spirit of the invention as set forth in the following claims.

What is claimed is:

1. A conveyor assembly, comprising:
    A. a continuous troughing conveyor belt trained about a head pulley and a tail pulley, wherein the conveyor assembly has a loading zone where material is loaded onto the belt and a transport zone between the loading zone and the head pulley for transporting the material from the loading zone;
    B. a pair of skirts extending longitudinally along the marginal edges of the conveyor belt, in operative engagement with the outer surface of the belt to retain the material on the belt;
    C. a plurality of successive belt supports longitudinally aligned along the length of the belt for supporting the conveyor belt, each belt support, comprising:
        1) a base extending across the width of the belt;
        2) a first central roller connected to the base intermediate the edges of the belt, supporting an intermediate portion of the belt;
        3) a pair of wing supports connected to the base, straddling the first central roller supporting the troughing sides of the conveyor belt, each wing comprising:
            a. longitudinally elongated slider bar extending along the inner surface of one of the marginal edges of the belt, supporting the one marginal edge to maintain the conveyor belt in operative engagement with one of the skirts; and
            b. a first wing roller intermediate the slider bar and the first central roller in operative engagement with the inner surface of the conveyor belt, having an axis of rotation transverse the axis of rotation of the first central roller;
    D. a plurality of successive second belt supports longitudinally aligned along the length of the belt for supporting the conveyor belt, each belt support, comprising:
        1) a base extending across the width of the belt;
        2) a second central roller connected to the base intermediate the edges of the belt, supporting an intermediate portion of the belt;
        3) a pair of second wing rollers connected to the base, straddling the central roller supporting the troughing sides of the conveyor belt, wherein each second wing roller extends substantially across the width of one of the troughing sides of the belt in operative engagement with the inner surface of the conveyor belt, and has an axis of rotation transverse the axis of rotation of the central roller;
    E. the distance between adjacent first belt supports being less than the distance between adjacent second belt supports.

2. The conveyor assembly of claim 1 wherein the first central roller is wider than one of the first wing rollers.

3. The conveyor assembly of claim 1 wherein the distance between adjacent belt supports in the loading zone is less than one half the width of the belt.

4. The conveyor assembly of claim 1 wherein said first central roller is resiliently deformable.

* * * * *